(12) United States Patent
Mukherjee

(10) Patent No.: US 7,433,535 B2
(45) Date of Patent: Oct. 7, 2008

(54) ENHANCING TEXT-LIKE EDGES IN DIGITAL IMAGES

(75) Inventor: Debargha Mukherjee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 10/675,387

(22) Filed: Sep. 30, 2003

(65) Prior Publication Data

US 2005/0069217 A1    Mar. 31, 2005

(51) Int. Cl.
  *G06K 9/40*    (2006.01)
(52) U.S. Cl. ............ 382/266; 382/260; 382/269; 382/274; 382/275; 358/3.26; 358/3.27
(58) Field of Classification Search ........... 382/260, 382/266, 269, 274, 275, 3.27; 358/3.26, 358/3.27, 520, 463
See application file for complete search history.

(56) References Cited

U.S. PATENT DOCUMENTS

| | | | | |
|---|---|---|---|---|
| 4,531,833 A * | 7/1985 | Ohtomo | ........... | 356/5.1 |
| 5,030,841 A * | 7/1991 | Wampfler | ........... | 250/559.22 |
| 5,179,599 A | 1/1993 | Forkmanek et al. | | |
| 5,202,933 A * | 4/1993 | Bloomberg | ........... | 382/176 |
| 5,515,452 A * | 5/1996 | Penkethman et al. | ........... | 382/141 |
| 5,745,596 A * | 4/1998 | Jefferson | ........... | 382/176 |
| 5,828,776 A * | 10/1998 | Lee et al. | ........... | 382/133 |
| 5,852,678 A | 12/1998 | Shiau et al. | | |
| 5,894,353 A * | 4/1999 | Hotta et al. | ........... | 356/446 |
| 5,946,420 A * | 8/1999 | Noh | ........... | 382/254 |
| 5,956,468 A | 9/1999 | Ancin | | |
| 6,188,492 B1 * | 2/2001 | Bungo et al. | ........... | 358/486 |
| 6,227,725 B1 | 5/2001 | Ancin et al. | | |
| 6,400,844 B1 | 6/2002 | Fan et al. | | |
| 6,633,683 B1 * | 10/2003 | Dinh et al. | ........... | 382/260 |
| 6,716,175 B2 * | 4/2004 | Geiser et al. | ........... | 600/450 |
| 6,757,081 B1 * | 6/2004 | Fan et al. | ........... | 358/474 |
| 6,782,143 B1 * | 8/2004 | Dube et al. | ........... | 382/176 |
| 6,817,982 B2 * | 11/2004 | Fritz et al. | ........... | 600/443 |
| 6,919,892 B1 * | 7/2005 | Cheiky et al. | ........... | 345/473 |
| 7,043,080 B1 * | 5/2006 | Dolan | ........... | 382/199 |
| 7,295,706 B2 * | 11/2007 | Wentland et al. | ........... | 382/181 |
| 7,302,111 B2 * | 11/2007 | Olsson et al. | ........... | 382/266 |
| 2002/0081023 A1 | 6/2002 | Uchida | | |

FOREIGN PATENT DOCUMENTS

| | | |
|---|---|---|
| EP | 0578875 | 1/1994 |
| EP | 1051025 | 11/2000 |
| WO | WO02/37832 | 5/2002 |

OTHER PUBLICATIONS

Ricardo L. de Queiroz et al., "Optimizing Block-Thresholding Segmentation for Multilayer Compression of Compound Images," IEEE Transactions on Image Processing, vol. 9, No. 9, Sep. 2000.

* cited by examiner

*Primary Examiner*—Yosef Kassa

(57) ABSTRACT

Systems and methods of enhancing text-like edges in digital images are described. In one aspect, pixels in a block of image pixels are segmented into first and second pixel classes. The pixel block is edge enhanced in response to a determination that the pixel block likely contains at least one text-like edge based on a measure of distance separating intensity values respectively representing intensity distributions of the first and second classes and based on measures of peakedness of intensity histograms computed for both the first and second pixel classes.

27 Claims, 5 Drawing Sheets

ENHANCING TEXT-LIKE EDGES IN DIGITAL IMAGES

TECHNICAL FIELD

This invention relates to systems and methods of enhancing text-like edges in digital images.

BACKGROUND

Text-like edges in digital images that are reproduced using, for example, color scanners and color printers, often are degraded by the presence of color fringes and other artifacts near the text-like edges. Scanned compound documents, which contain both images and text, are particularly susceptible to such degradation. The presence of these artifacts significantly degrades the overall appearance quality of the reproduced digital images. In addition, such degradation adversely affects the efficiency with which various compression algorithms may code digital images to reduce the amount of memory needed to store the digital images. For example, so-called "lossless" compression schemes generally do not work well on scanned images. So-called "lossy" compression methods, on the other hand, generally work well on continuous tone regions of scanned images but not on regions of scanned images containing text.

Compound documents may be compressed efficiently using a mixed raster content (MRC) document image representation format. In this compression scheme, an image is segmented into two or more image planes. A selector plane indicates, for each pixel, which of the image planes contains the image data that should be used to reconstruct the final output image. The overall degree of image compression may be increased in this approach because the image data oftentimes can be segmented into separate planes that are smoother and more compressible than the original image. Different compression methods also may be applied to the segmented planes, allowing the overall degree of image compression to be further increased.

One approach for handling a color or grayscale pixel map of a scanned compound document for compression into an MRC format involves segmenting an original pixel map into two planes and compressing the data of each plane. The image is segmented by separating the image into two portions at the edges. One plane contains image data for the dark sides of the edges, while image data for the bright sides of the edges and the smooth portions of the image are placed on the other plane.

Another approach for handling scanned document images includes an edge detector that detects edges of text in a digital image containing visual noise. A background luminance estimator generates a background threshold that is based on an estimation of the image background luminance. The background threshold depends on the luminance values of the edge pixels of the detected edges. In one embodiment, the background threshold is generated using only the edge pixels that are on the lighter side of the detected edges. An image enhancer at least partially removes visual noise in a scanned document by selectively modifying pixel values of the image using the background threshold. The image enhancer also may perform color fringe removal and text enhancements, such as edge sharpening and edge darkening.

Various unsharp masking approaches also have been proposed for sharpening edge features in digital images. In general, an unsharp mask filter subtracts an unsharp mask (i.e., a blurred image that is produced by spatially filtering the specimen image with a Gaussian low-pass filter) from an input image. In one approach, an unsharp mask filter increases the maximum local contrast in an image to a predetermined target value and increases all other contrast to an amount proportional to the predetermined target value. In an adaptive spatial filter approach, pixels of an input image with activity values that are close to an iteratively adjustable activity threshold are selectively enhanced less than the image pixels with activity values that are substantially above the threshold. In another spatial filtering method, an adaptive edge enhancement process enhances the sharpness of features in an image having steep tone gradients.

SUMMARY

The invention features systems and methods of enhancing text-like images in a digital image.

In one aspect, of the invention features a method of enhancing text-like edges in an image of pixels. In accordance with this inventive method, pixels in a block of image pixels are segmented into first and second pixel classes. The pixel block is edge enhanced in response to a determination that the pixel block likely contains at least one text-like edge based on a measure of distance separating intensity values respectively representing intensity distributions of the first and second classes and based on measures of peakedness of intensity histograms computed for both the first and second pixel classes.

In another aspect, the invention features an image enhancement engine that is operable to implement the text-like edge enhancement method described above.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments described in detail below enhance text-like edges in digital images. In these embodiments, a text-like edge in a block of digital image data is evidenced by the presence of a substantially bi-modal distribution in the intensity histogram of the pixel block. Based on such evidence, these embodiments accurately detect the presence of text-like edges. This allows the contrast of text-like edges in an image to be enhanced while reducing the risk of introducing artifacts in non-text-like regions of the image.

Figure 1:
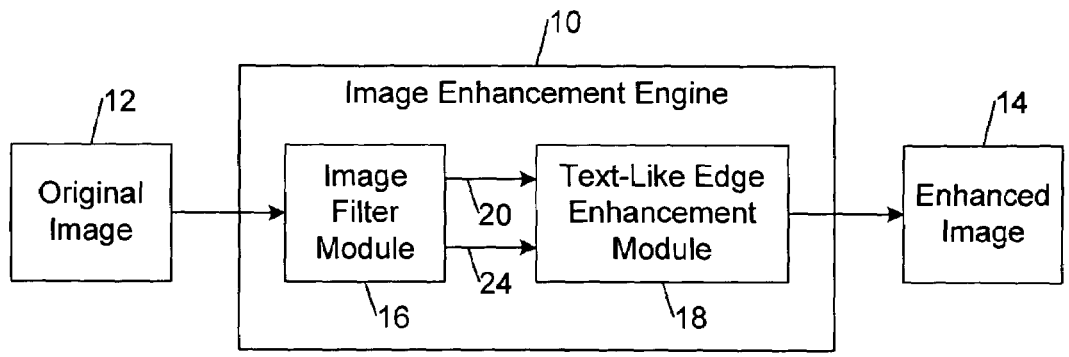
FIG. 1 a is block diagram of an embodiment of an image enhancement engine that is operable to process an original image into an enhanced image having enhanced text-like edges.

FIG. 1 shows an embodiments of an image enhancement engine 10 that is operable to process an original image 12 into an enhanced image 14 having contrast-enhanced text-like edges.

The original image 12 may include any type of image content, including a logo (e.g., a company logo), graphics, pictures, text, images, or any pattern that has visual significance. The image content may appear in border regions, the foreground, or the background of original image 12. The image content also may be in the form of a binary image (e.g., a black and white dot pattern), a multilevel image (e.g., a gray-level image), or a multilevel color image. The original image 12 may be produced by any digital image formation process or apparatus, including a bitmap graphics engine, a vector graphics engine, and a scanner, such as a conventional desktop optical scanner (e.g., a ScanJet® scanner available from Hewlett-Packard Company of Palo Alto, Calif., U.S.A.), a portable scanner (e.g., a CapShare® portable scanner available from Hewlett-Packard Company of Palo Alto, Calif., U.S.A.), or a conventional facsimile machine.

Figure 2:
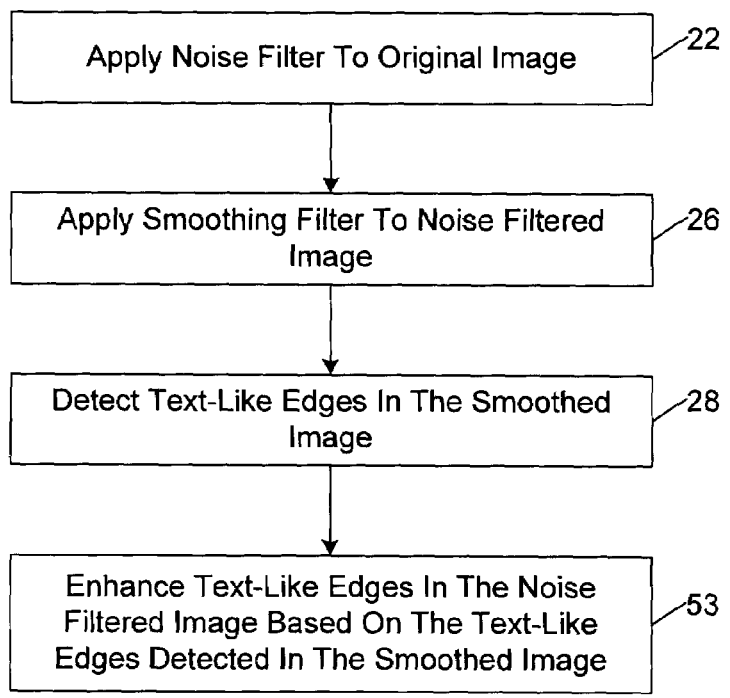
FIG. 2 is a flow diagram of an embodiment of a method executed by the image enhancement engine of FIG. 1 to process the original image into the enhanced image.

Referring to FIGS. 1 and 2, in some embodiments, image enhancement engine 10 includes an image filter module 16 and a text-like edge enhancement module 18. In some embodiments, the image filter module 16 and the text-like edge enhancement module 18 are implemented as one or more respective software modules that are executable on a computer (or workstation). In general, a computer (or workstation) on which the image filter module 16 and the text-like edge enhancement module 18 may be executed includes a processing unit, a system memory, and a system bus that couples the processing unit to the various components of the computer. The processing unit may include one or more processors, each of which may be in the form of any one of various commercially available processors. The system memory typically includes a read only memory (ROM) that stores a basic input/output system (BIOS) that contains start-up routines for the computer, and a random access memory (RAM). The system bus may be a memory bus, a peripheral bus or a local bus, and may be compatible with any of a variety of bus protocols, including PCI, VESA, Microchannel, ISA, and EISA. The computer also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data) with the computer using a keyboard and a mouse. Other input devices (e.g., a microphone, joystick, or touch pad) also may be provided. Information may be displayed to the user on a monitor or with other display technologies. The computer also may include peripheral output devices, such as speakers and a printer. In addition, one or more remote computers may be connected to the computer over a local area network (LAN) or a wide area network (WAN) (e.g., the Internet).

Image filter module 16 applies a noise filter to the original image 12 to produce a noise filtered image 20 (step 22). The noise filter may be any type of filter that reduces noise artifacts in original image 12. For example, in one implementation, the noise filter is an impulse noise removal filter. In this implementation, the impulse noise removal filter compares every given image pixel with its surrounding eight neighbor pixels in a 3×3 window centered on the given image pixel. For each window position over the original image 12, if at least one of the neighbor pixels is close in color to the center pixel, the center pixel is not filtered. Otherwise, if all of the eight neighbor pixels are sufficiently different from the center pixel, the center pixel is replaced by the median color of the eight surrounding neighbors. For example, in one implementation, the center pixel is replaced by the medians of the red, green, and blue color components of the surrounding eight neighbor pixels. In this implementation, the medians for the red, green, and blue color components are computed separately. By removing noise artifacts in original image 12, image filter module 16 facilitates any subsequent compression encoding of the enhanced image 14.

The image filter module 16 also applies a smoothing filter to the noise filtered image 20 to produce a smoothed image 24 (step 26). The smoothing filter may be any type of smoothing filter. In one implementation, the smoothing filter is a Gaussian smoothing filter that is applied to the noise filtered image produced by the noise filter over a 3×3 sliding window. The resulting smoothed image 24 is used by the text-like edge enhancement module 18 to detect text-like edges in the original image 12. In addition, the smoothed image 24 may be used in base determination and color separation algorithms in any subsequent image compression process that may be applied to the enhanced image 14.

Figure 3:
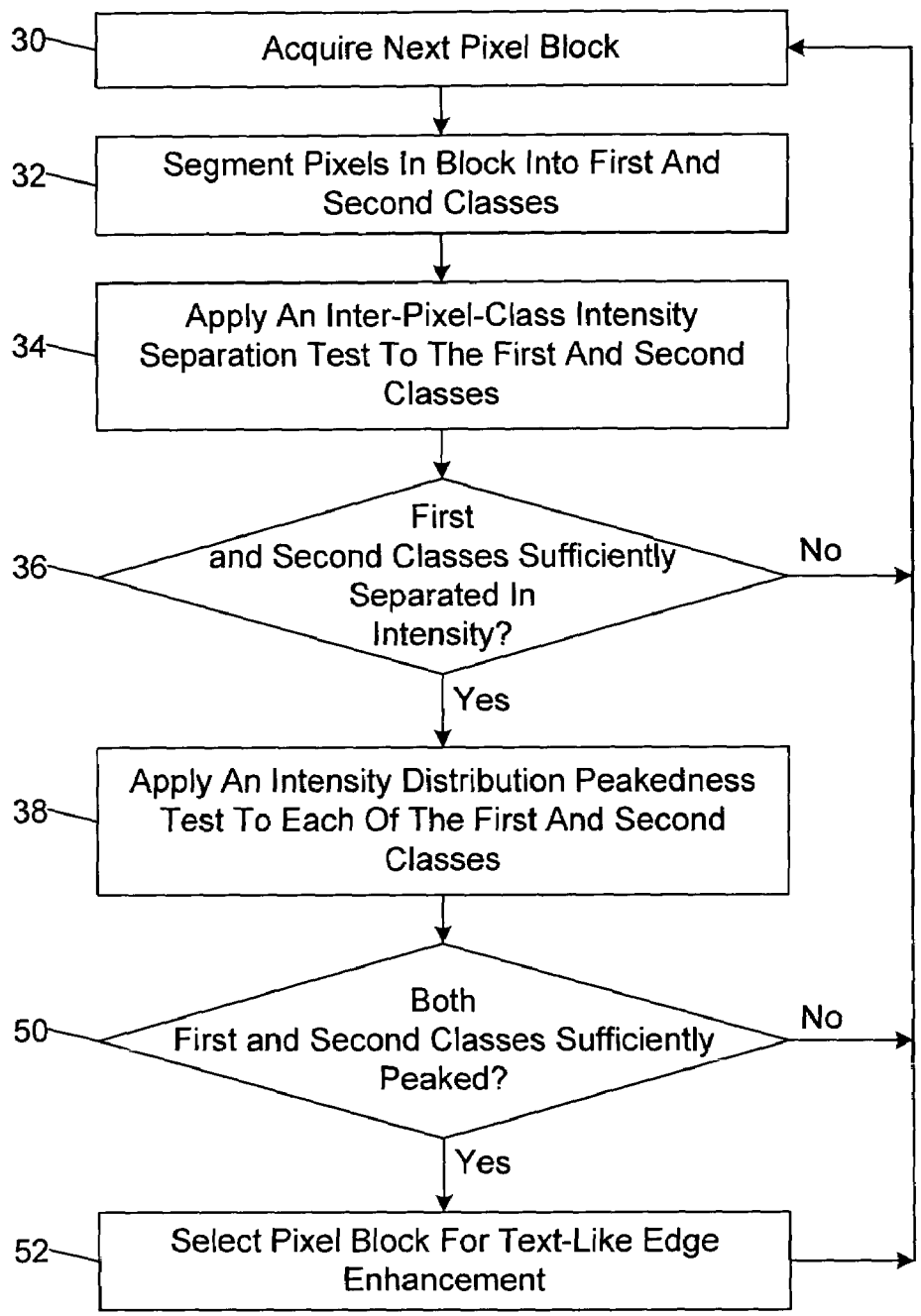
FIG. 3 is a flow diagram of an embodiment of a method of enhancing text-like edges in an image.
Figure 4:
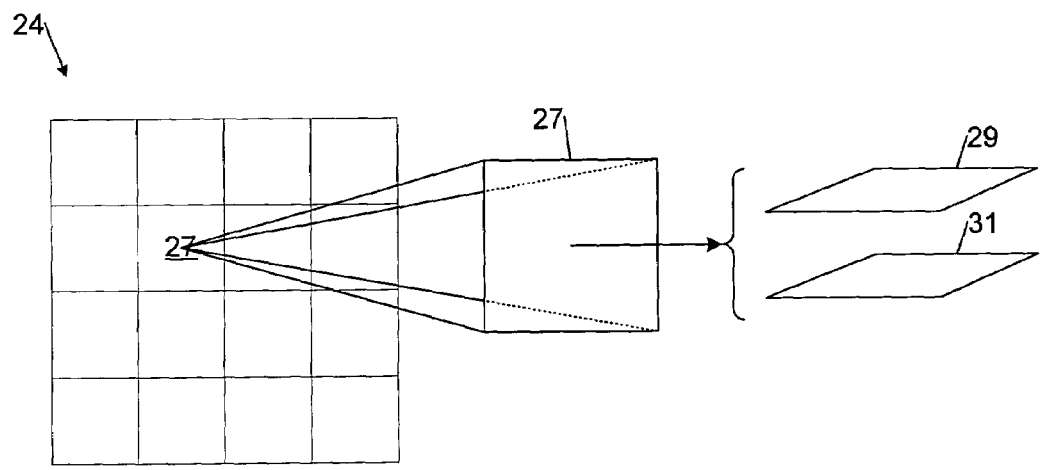
FIG. 4 is a diagrammatic view of a block of pixels of an image segmented into first and second pixels classes.

Referring to FIGS. 2, 3, and 4, in some embodiments, text-like edge enhancement module 18 detects text-like edges in the smoothed image 24 on a block-by-block basis as follows (step 28; FIG. 2).

Text-like edge enhancement module 18 acquires a block 27 (FIG. 4) of pixels in the smoothed image 24 (step 30; FIG. 3). The block of pixels may be an N×M pixel block, where N and M are integers corresponding to the number of pixel rows and pixel columns in the block, respectively. In general, the size of the pixel block depends on the resolution of the original image 12. For example, in some implementations, when the resolution of the original image 12 is 300 dots per inch (dpi) 8×8 pixel blocks are used, and when the resolution of the original image 12 is 600 dpi 16×16 pixel blocks are used.

The pixels in the acquired block of pixels are segmented into first and second classes (or planes) 29, 31 (step 32). In some implementations, the pixels are segmented into light and dark pixel classes based on the intensity values of the pixels. The intensity values may be obtained directly from the luminance (Y) values of pixels represented in the Y, Cr, Cb color space. Alternatively, the intensity values may be obtained indirectly by computing intensity values for the pixels in other color space representations. The pixels may be segmented using any intensity value segmentation process. In some implementations, the pixels are segmented into light and dark pixel classes by applying a k-means vector quantization process (with k=2) to the pixels initialized with color pixels corresponding to the maximum and minimum pixel intensity values in the pixel block.

Text-like edge enhancement module 18 applies an inter-pixel-class intensity separation test to the first and second classes to screen the pixel block for text-like edges (step 34). The inter-pixel-class intensity separation test determines whether the first and second pixel classes are sufficiently separated in intensity that the two classes mark a boundary corresponding to a text-like edge In some implementations, the inter-pixel-class intensity separation test involves computing a measure of distance between intensity values respectively representative of the first and second classes. Any statistical measure representative of the intensities of the first and second pixel classes may be used, including the mean, mode, median, centroid, and average of the intensity values for the first and second classes. The distance separating the computed representative intensity values for the first and second classes is compared to a prescribed, empirically determined threshold to determine whether the first and second classes are sufficiently separated in intensity as to be likely to correspond to a text-like edge. If the first and second classes are sufficiently separated in intensity (step 36), text-like edge enhancement module 18 applies an intensity distribution peakedness test to each of the first and second classes (step 38). Otherwise, text-like edge enhancement is not performed on the block and text-like edge enhancement module 18 acquires the next pixel block (step 30).

Figure 5:
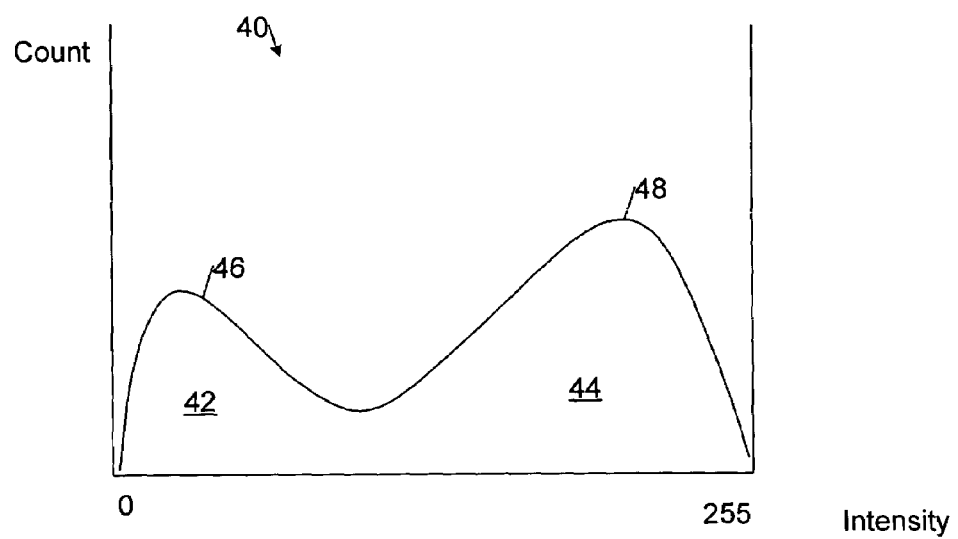
FIG. 5 is a histogram of intensity values of pixels in a pixel block of an image.
Figure 6:
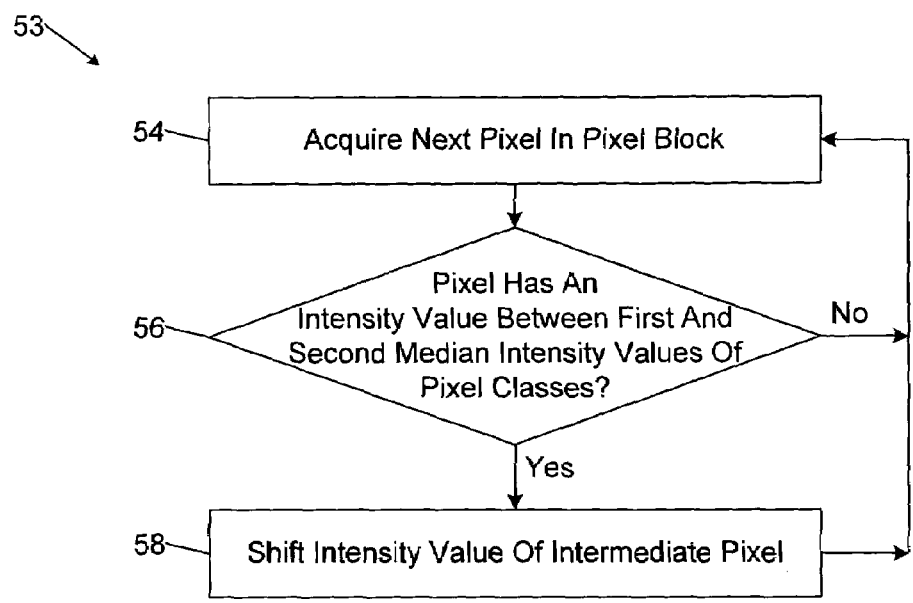
FIG. 6 is a flow diagram of an embodiment of a method of enhancing text-like edges in an image.
Figure 7A:
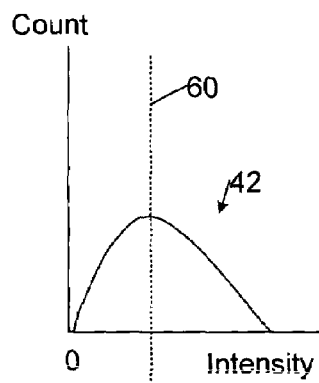
FIG. 7A is a histogram of intensity values of pixels that have been segmented into a light pixel class.
Figure 7B:
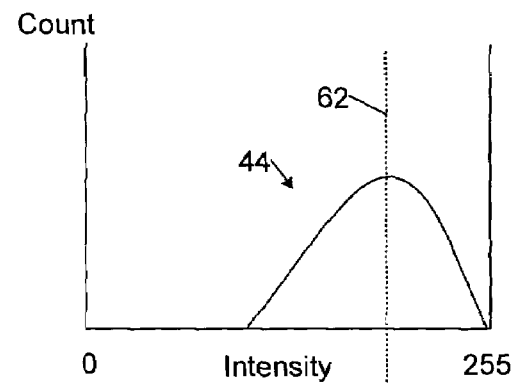
FIG. 7B is a histogram of intensity values of pixels that have been segmented into a dark pixel class.

The intensity distribution peakedness test determines whether each of the first and second pixel classes is characterized by a sufficiently peaked intensity histogram that the pixel block is likely to contain at least one text-like edge. In some embodiments, the intensity histograms are computed from the pixel values of the noise filtered image 20. As shown in FIG. 5, for example, an exemplary intensity histogram 40 for a pixel block containing a text-like edge is characterized by pixels segmented into light and dark classes 42, 44, each of which is characterized by a distinct peak 46, 48. Any statistical measure of peakedness may be used to determine whether the intensity histogram for each pixel class 42, 44 is sufficiently peaked. In one implementation, the kurtosis (i.e., the fourth central moment of the distribution to the fourth power of the standard deviation) is used as a measure of peakedness. In this implementation, the kurtosis is compared to a prescribed, empirically determined threshold. In general, the prescribed kurtosis threshold value should fall between 1.8 (corresponding to a uniform intensity histogram) and 3.0 (corresponding to a Gaussian intensity histogram). In an exemplary implementation, the kurtosis threshold preferably is between 2.0 and 2.5. If the intensity histograms of both of the first and second pixel classes are sufficiently peaked (step 50), the pixel block is selected for text-like edge enhancement (step 52). Otherwise, text-like edge enhancement is not performed on the block and text-like edge enhancement module 18 acquires the next pixel block (step 30).

Referring back to FIG. 2, after at least one text-like edge has been detected in a pixel block of the smoothed image 24 (step 28), text-like edges in the noise filtered image 20 are enhanced (step 53).

Figure 8A:
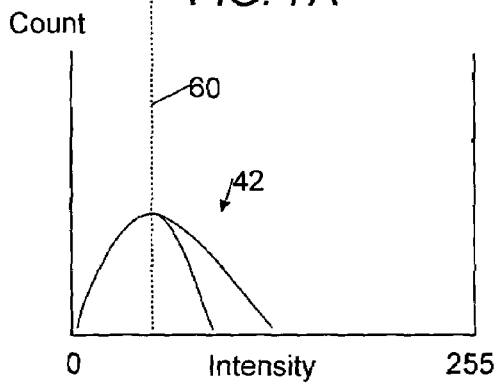
FIG. 8A is a histogram of intensity values of pixels in the light pixel class of FIG. 7A after values of intermediate pixels have been shifted toward the median intensity value of the light pixel class.
Figure 8B:
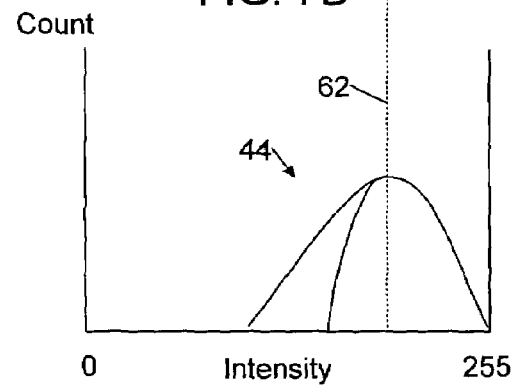
FIG. 8B is a histogram of intensity values of pixels in the light pixel class of FIG. 7B after values of intermediate pixels have been shifted toward the median intensity value of the dark pixel class.

As shown in FIGS. 6, 7A, 7B, 8A, and 8B, in some embodiments, text-like edges in the pixel block are enhanced by pulling apart the intensity values of pixels in the first and second classes in a controlled manner. To this end, a pixel in the current pixel block is acquired (step 54). If the pixel has an intensity value between first and second median intensity values computed for the first and second pixel classes (step 56), the pixel is referred to as an "intermediate pixel" and its intensity value is shifted toward the median intensity value of the pixel class into which the pixel was segmented (step 58). For example, assuming the first and second pixel classes 42, 44 are characterized by the sufficiently peaked intensity histograms shown in FIGS. 7A and 7B, respectively, which have median intensity values 60, 62. In this example, the pixels in the first class 42 with intensity values greater than (i.e., to the right of) the median pixel value 60 are shifted down (i.e., to the left) in intensity, as shown in FIG. 8A. Similarly, the pixels in the second class 44 with intensity values less than (i.e., to the left of) the median pixel value 62 are shifted up (i.e., to the right) in intensity, as shown in FIG. 8B. In some implementations, the intensities of the intermediate pixel values are shifted without changing the median intensity values for the first and second pixel classes. In one of these implementations, the intensity value of each intermediate pixel is shifted by reducing its distance from the median intensity value of its pixel class by a fixed ratio (e.g., 2). In these implementations the likelihood that shading in original image 12 will be overly brightened or overly darkened is reduced.

If the pixel does not have an intensity value between first and second median intensity values computed for the first and second pixel classes (i.e., the pixel is not an intermediate pixel) (step 56), the next pixel is acquired without shifting the intensity value of the non-intermediate pixel.

Figure 9:
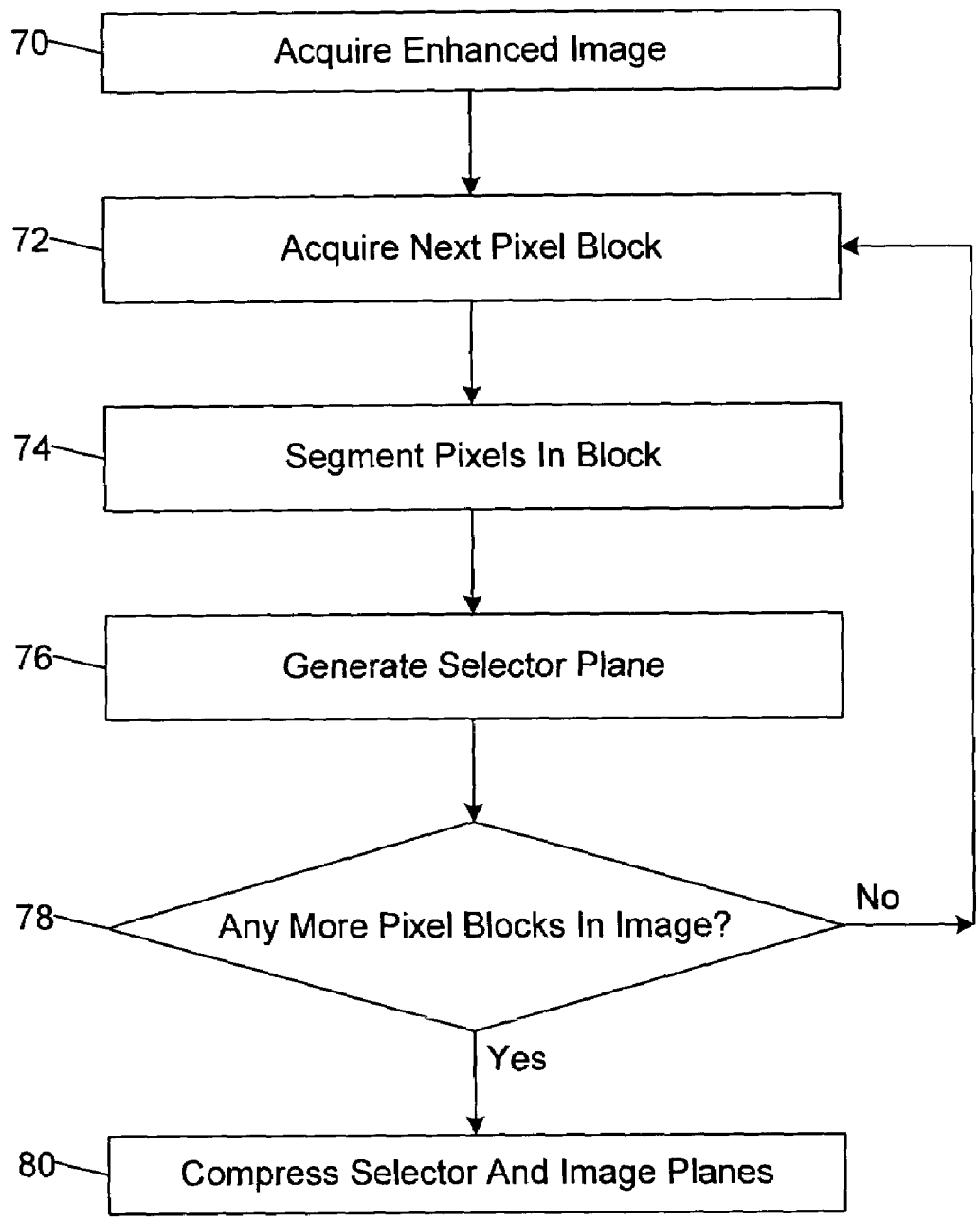
FIG. 9 is a flow diagram of an embodiment of a method of compressing an image that incorporates the text-like edge enhancement method of FIG. 3.

FIG. 9 shows an embodiment of a method of compressing original image 12 into mixed raster content (MRC) format that incorporates implementations of the text-like edge enhancement embodiments described above. In this embodiment, the enhanced image 14, which is generated by noise filtering and enhancing text-like edges in the original image 12, is acquired (step 70). A block of pixels in the enhanced image 14 is acquired (step 72). Pixels in the block are segmented into first and second image planes (step 74). For example, the pixels may be segmented into background and foreground image planes based on a preselected threshold. The first and second image planes are stored at the same bit depth and number of colors as the enhanced image 14. In some implementations, the first and second image planes may be stored at a different (e.g., lower) resolution than the enhanced image 14. A selector plane is generated and stored as a bit map (step 76). The selector plane maps pixels in the enhanced image 14 to corresponding pixels in the first and second image planes. If there are any more pixel blocks to process in the enhanced image 14 (step 78), the next block of pixels is acquired (step 70). Otherwise, the selector plane and the first and second image planes are compressed (step 80). The selector and image planes typically are compressed using a method suitable for the type of data contained in the planes. For example, the first and second image planes may be compressed and stored using a lossless compression format (e.g., gzip or CCITT-G4). The selector plane may be compressed using, for example, a group 4 (MMR) image compression format.

Other embodiments are within the scope of the claims.

The systems and methods described herein are not limited to any particular hardware or software configuration, but rather they may be implemented in any computing or processing environment, including in digital electronic circuitry or in computer hardware, firmware, or software.

What is claimed is:

1. A method of enhancing text-like edges in an image of pixels, comprising the steps of:
   segmenting pixels in a block of image pixels into first and second pixel classes; and edge enhancing the pixel block in response to a determination that the pixel block likely contains at least one text-like edge based on a measure of distance separating intensity values respectively representing intensity distributions of the first and second classes and based on measures of peakedness of intensity histograms computed for both the first and second pixel classes.

2. The method of claim 1, wherein segmenting pixels comprising classifying pixels in the block into light and dark pixel classes based on intensities of the pixels in the blocks.

3. The method of claim 2, wherein pixels are classified based on luminance values of the pixels.

4. The method of claim 1, wherein the distance measure corresponds to a measure of distance between first and second mean intensity values computed for the first and second pixel classes, respectively.

5. The method of claim 4, wherein the first and second mean intensity values correspond to centroids of the first and second pixel classes, respectively.

6. The method of claim 4, wherein the determination that the pixel block likely contains at least one text-like edge is based on a comparison between the measure of distance between the first and second mean intensity values and a threshold.

7. The method of claim 6, wherein the step of edge enhancing the pixel block is omitted in response to a determination that the measure of distance between the first and second mean intensity values is less than the threshold.

8. The method of claim 1, wherein the determination that the pixel block likely contains at least one text-like edge is based on comparisons between the peakedness measures and respective thresholds.

9. The method of claim 8, wherein the peakedness measures correspond to the kurtosis of intensity histograms computed for both the first and second pixel classes.

10. The method of claim 8, wherein the step of edge enhancing the pixel block is omitted in response to a determination that the peakedness measures of one or both of the first and second pixel classes are below respective thresholds.

11. The method of claim 1, further comprising applying a noise filter to the image before pixels are segmented into the first and second pixel classes.

12. The method of claim 11, wherein the noise filter applied to the image is an impulse noise filter.

13. The method of claim 11, further comprising applying a Gaussian smoothing filter to the image before pixels are segmented into the first and second pixel classes.

14. The method of claim 1, wherein the step of edge enhancing comprises the step of shifting intensity values of intermediate pixels having intensity values between first and second median intensity values computed for the first and second pixel classes, respectively.

15. The method of claim 14, wherein the intensity value of any given intermediate pixel is shifted toward the median intensity value of the pixel class into which the given intermediate pixel was segmented.

16. The method of claim 14, wherein intermediate pixel intensity values are shifted without changing the first and second median intensity values for the first and second pixel classes.

17. The method of claim 16, wherein the intensity value of any given intermediate pixel is shifted by reducing its distance from the median intensity value of the pixel class into which the given intermediate pixel was segmented by a fixed ratio.

18. The method of claim 14, wherein the intensity values of non-intermediate pixels in the block are unchanged by the intensity-value-shifting step.

19. The method of claim 1, further comprising compressing the image after the edge enhancing step has been applied to the image.

20. The method of claim 19, wherein the image is compressed in accordance with a mixed raster content image compression format.

21. A system of enhancing text-like edges in an image of pixels, comprising an image enhancement engine operable to:
   segment pixels in a block of image pixels into first and second pixel classes; and
   edge enhance the pixel block in response to a determination that the pixel block likely contains at least one text-like edge based on a measure of distance separating intensity values respectively representing intensity distributions of the first and second classes and based on measures of peakedness of intensity histograms computed for both the first and second pixel classes.

22. The system of claim 21, wherein the image enhancement engine is operable to segment pixels by classifying pixels in the block into light and dark pixel classes based on intensities of the pixels in the blocks.

23. The system of claim 21, wherein the distance measure corresponds to a measure of distance between first and second median intensity values computed for the first and second pixel classes, respectively.

24. The system of claim 21, wherein the determination that the pixel block likely contains at least one text-like edge is based on comparisons between the peakedness measures and respective thresholds.

25. The system of claim 21, wherein the image enhancement engine is operable to apply a noise filter to the image before pixels are segmented into the first and second pixel classes.

26. The system of claim 21, wherein the image enhancement engine is operable to edge enhance the pixel block by shifting intensity values of intermediate pixels having intensity values between first and second median intensity values computed for the first and second pixel classes, respectively.

27. A computer readable medium storing computer readable instructions causing a machine to perform operations comprising:
   segmenting pixels in a block of image pixels into first and second pixel classes; and
   edge enhancing the pixel block in response to a determination that the pixel block likely contains at least one text-like edge based on a measure of distance separating intensity values respectively representing intensity distributions of the first and second classes and based on measures of peakedness of intensity histograms computed for both the first and second pixel classes.

* * * * *